United States Patent [19]

Ballu

[11] Patent Number: 4,463,521
[45] Date of Patent: Aug. 7, 1984

[54] DEVICE FOR DEPOSITING A TREATMENT LIQUID, SUCH AS A WEEDKILLER, ONTO PLANTS

[75] Inventor: Patrick J. Ballu, Reims, France

[73] Assignee: Tecnoma, Epernay, France

[21] Appl. No.: 378,274

[22] Filed: May 14, 1982

[30] Foreign Application Priority Data

May 20, 1981 [FR] France ............................... 81 10012

[51] Int. Cl.$^3$ ........................................... A01M 21/00
[52] U.S. Cl. ..................................................... 47/1.5
[58] Field of Search ............................. 47/1.5, 1.7, 81; 401/23, 199

[56] References Cited

U.S. PATENT DOCUMENTS

| | | | |
|---|---|---|---|
| 4,187,638 | 2/1980 | Haroy et al. | 47/1.5 |
| 4,219,964 | 9/1980 | Dale | 47/1.5 |
| 4,285,160 | 8/1981 | Barton et al. | 47/1.5 |
| 4,305,224 | 12/1981 | Maddock | 47/1.5 |
| 4,309,842 | 1/1982 | Jones | 47/1.5 |
| 4,310,988 | 1/1982 | Porter | 47/1.5 |
| 4,332,106 | 6/1982 | Barton et al. | 47/1.5 |

FOREIGN PATENT DOCUMENTS 86898   3/1966   France ................................... 47/1.7

Primary Examiner—Robert A. Hafer
Assistant Examiner—D. O. DeMille
Attorney, Agent, or Firm—Watson, Cole, Grindle & Watson

[57] ABSTRACT

This invention relates to a device for depositing a treatment liquid, such as a weedkiller, on plants, the device comprising a tank for the liquid, a plurality of wicks outside the tank, and elements for transferring the liquid contained in the tank to the ends of the wicks. The tank has a horizontally elongate shape and a cross-section which is very much greater than that of the wicks. The tank forms a ramp integral with a dispensing tube, which is mounted underneath the bottom of the elongate tank, parallel to its longitudinal axis, so that the dispensing tube is fed with liquid from a zone of the tank bottom, preferably adjacent to one of the ends of the tank. The dispensing tube has a cross-section similar to that of each wick, and a plurality of inlets or branches in which the ends of the wicks are immobilized by clamping and sealing devices, so that the remainders of the wicks extend freely outside the dispensing tube and the tank.

4 Claims, 10 Drawing Figures

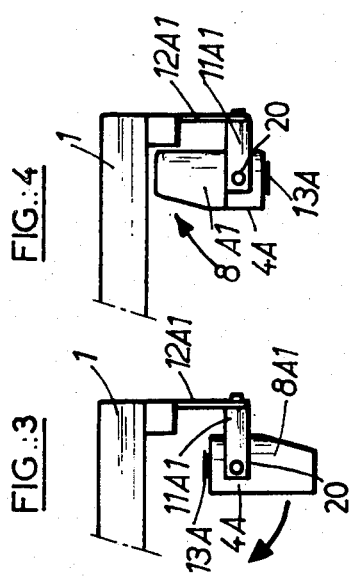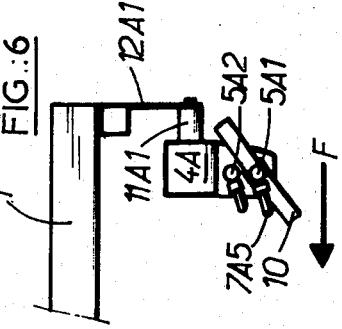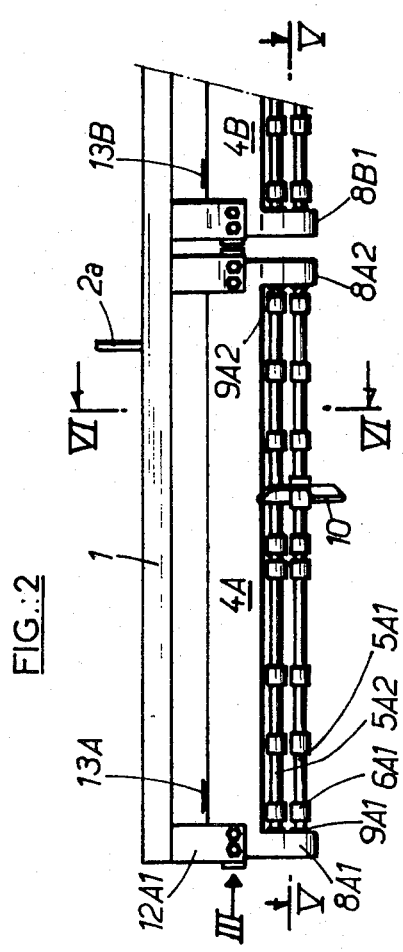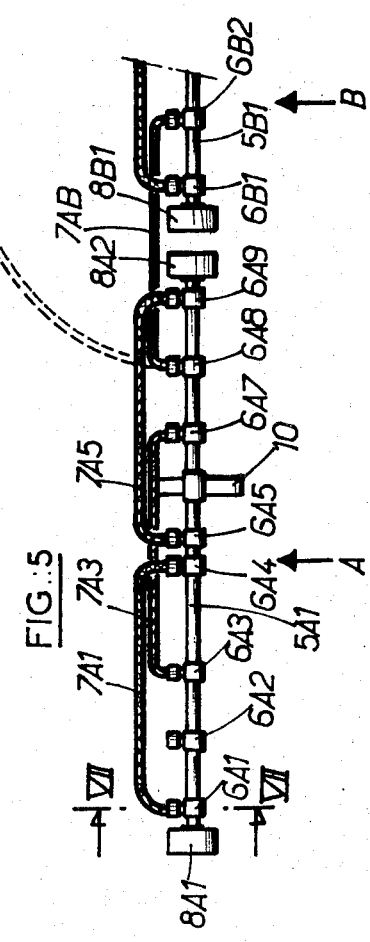

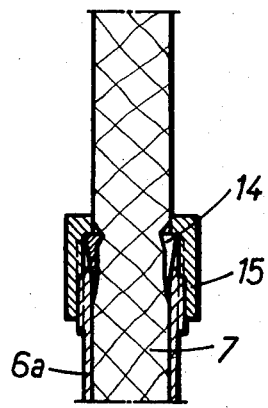
FIG.:7
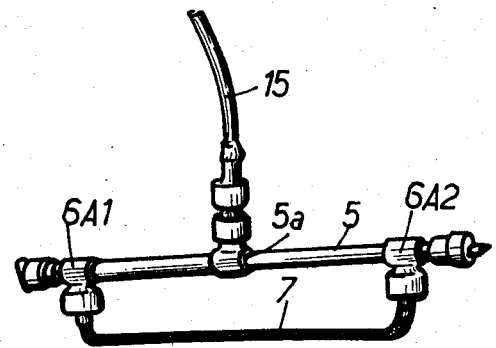
FIG.:8
FIG.:9

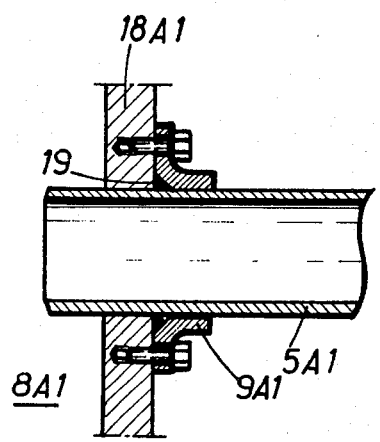
FIG.: 10

DEVICE FOR DEPOSITING A TREATMENT LIQUID, SUCH AS A WEEDKILLER, ONTO PLANTS

BACKGROUND OF THE INVENTION

The present invention relates to a device for depositing a treatment liquid, such as a weedkiller, onto plants.

Devices of this type, which each comprise at least one wick soaked with the liquid to be deposited, are already known. In a known device of this type, a large fraction of the length of the wick is immersed in a tank of liquid, the remainder of the wick being arranged outside this tank so that it can be brought into contact with the plants. This known arrangement does not easily make it possible to regulate the amount of liquid which soaks the wick and which is deposited onto the plants.

SUMMARY OF THE INVENTION

The device according to the present invention also comprises at least one wick soaked with the treatment liquid to be deposited; in this device, the wick extends between two fixed points, and the device comprises means for bringing the liquid to be deposited into contact with at least one short zone of the wick.

The device according to the present invention offers, in particular, the advantage that it permits easy control of the liquid brought into the wick since this control can take place in the short zone of the wick into which the liquid is brought.

In a preferred embodiment of the device according to the present invention, each wick extends between two branches of a tube for dispensing the liquid, for example between its two ends; in particular, the two ends of each wick can be immobilized in branches or in the open ends of the dispensing tube, for example in the shape of a U, by clamping and sealing means comprising, for example, a split ring made of a deformable material, which is fitted to the end of the wick and with which a nut, screwed to the branch or to the corresponding end of the dispensing tube, makes it possible to compress the wick to a greater or lesser extent, so as to regulate the flow of liquid into the wick between a zero value and a maximum value.

DESCRIPTION OF THE DRAWINGS

By way of examples, two embodiments of the device according to the present invention are described below and illustrated schematically in the attached drawings:

FIG. 2 is a view of FIG. 1 in the direction of the arrow II.

FIG. 3 is a view of FIG. 2 in the direction of the arrow III.

FIG. 4 is a view corresponding to FIG. 3, showing the ramp for dispensing the liquid, in the out-of-service position.

FIGS. 5 and 6 are sectional views of FIG. 2, respectively along the lines V—V and VI—VI.

FIG. 7 is a sectional view of FIG. 5 along the line VII—VII.

FIGS. 8 and 9 show the second embodiment and its method of use.

FIG. 10 shows a detail of FIGS. 2 and 5.

DETAILED DESCRIPTION OF THE PREFERRED EMBODIMENTS

Figure 1:
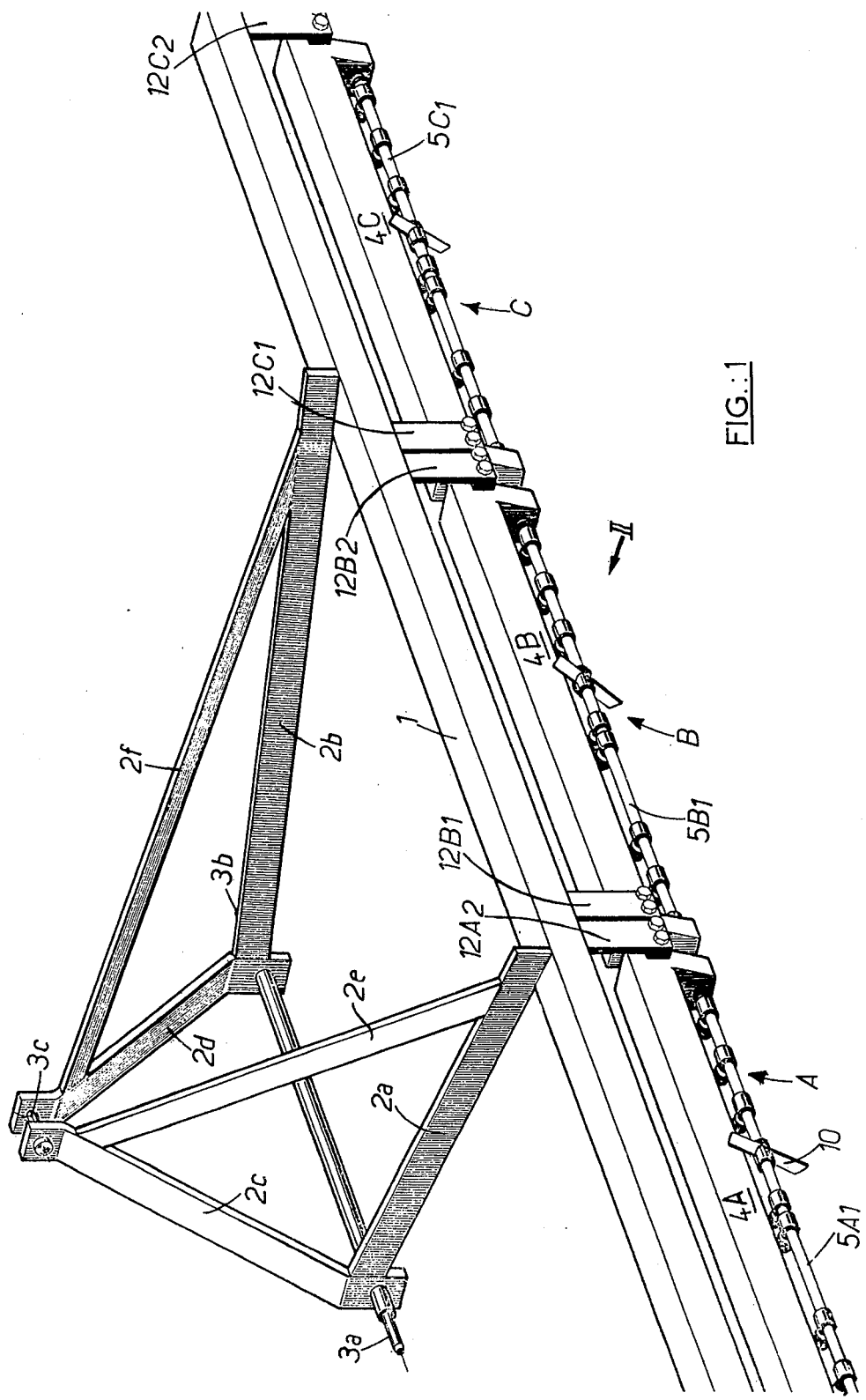
FIG. 1 is a perspective view of the first embodiment.

The perspective view of FIG. 1 shows three ramps, A, B and C, which are aligned horizontally underneath a horizontal beam 1, to the upper face of which the ends of two joists 2a, 2b are fixed, for example welded; the elements 1, 2a, 2b form, with other joists, 2c, 2d, 2e, 2f, a frame comprising two lower horizontal bearings, 3a and 3b, and one upper horizontal bearing, 3c; the three bearings 3a, 3b, 3c make it possible to detachably fasten the whole device to a support (not shown), to which several similar devices can also be fastened, and which is itself capable of being coupled to a tractor, for example to its customary three-point coupling members.

Each of the ramps A to C is formed of a substantially horizontal, elongate tank, 4A, 4B or 4C, which, through its ends, feeds two dispensing tubes, such as 5A1 and 5A2, which are superposed as shown in FIG. 2 and are substantially parallel to the horizontal axis of the corresponding tank 4A. In each of the two tubes, for example 5A1, of each of the bars, for example A, there are inserted T-pieces, such as 6A1, 6A2 . . . 6A9 (FIG. 5); three wicks, for example 7A1, 7A3 and 7A5, consisting of a suitable porous material, have their ends immobilized respectively in those branches of some of the T-pieces which are transverse to the corresponding feed tube, 5A1; for example, the ends of the wick 7A1 are immobilized in the transverse branches of the T-pieces 6A1 and 6A4. As shown in FIG. 5, the arrangement is preferably chosen so that those parts of the wicks which are held parallel to the corresponding dispensing tube form a kind of continuous "front" facing forwards in the direction of advance of the ramps, this direction being indicated by the arrow F in FIG. 6.

Furthermore, the ends of the elongate tank, for example 4A, of each ramp are extended downwards by two chambers, 8A1 and 8A2, and each of the corresponding dispensing tubes, 5A1 and 5A2, is mounted so that its two ends come out respectively into the two chambers 8A1 and 8A2; preferably as shown in FIGS. 2 and 10, the ends of each of the dispensing tubes 5A1 and 5A2 are mounted to pivot in bearings, such as 9A1 and 9A2, provided on the opposite walls such as 18A1 of the two chambers 8A1 and 8A2; gaskets such as 19 are provided in the bearings such as 9A1 and 9A2, in order to prevent the liquid contained in the corresponding chambers from escaping; furthermore, known means, not shown in detail, for example nuts or screws, are provided in order to enable the dispensing tubes 5A1, 5A2, mounted to pivot, to be locked in chosen angular positions. A gripping member 10, for example, is fixed transversely to the periphery of the lower dispensing tube, 5A1, in order to enable it to be rotated by a limited angle in bearings when the corresponding locking means have been released; as shown in FIG. 6, this makes it possible to modify the orientation of the wicks fed by tube 5A1 in relation to the wicks fed by tube 5A2 of the same ramp, and also to modify their position relative to the plants to be treated, in accordance with their height above the ground, their shape, etc.; the tank, for example 4A, of each of the bars is itself mounted so that it can pivot, relative to the beam 1 of the frame, about a substantially horizontal axis; FIGS. 3 and 4 show, in particular, that each tank, for example 4A, is fitted at each of its ends with a pivot 20 supported by a horizontal arm, 11A1, of a right-angle bracket, the other arm of which, for example 12A1, is fixed underneath the beam 1 (see also FIG. 2). FIG. 3 shows the pivoting tank 4A in its service position, for which its two chambers, such as 8A1, face downwards, the dispensing tubes 5A1 and 5A2, and the wicks which they feed, therefore being underneath the noted tank 4A, as shown in FIGS. 2 and 6. FIG. 4, on the other hand, shows the tank 4A in its out-of-service position, for which its chambers, such as 8A1, face upwards, the dispensing tubes 5A1 and 5A2, and the wicks which feed them, therefore being above the tank 4A; that wall of each tank, such as 4A, which is opposite its chambers 8A1 and 8A2 is provided with a filling orifice, such as 13A, fitted with a leaktight plug; each tank is filled in the service position illustrated in FIG. 3, and it is emptied in the out-of-service position illustrated in FIG. 4, which makes it possible to easily achieve complete emptying.

The arrangement of the chambers such as 8A1 and 8A2 at the two ends of each of the tanks such as 4A is advantageous, in particular insofar as it guarantees the feeding of the dispensing tubes 5A1 and 5A2, irrespective of the level of liquid in the tank 4A and irrespective of the possible inclination of the corresponding ramp to the horizontal.

As shown in FIG. 5, two adjacent ramps, for example A and B, can be connected in series at the level of their dispensing tubes, for example 5A1 and 5B1; to do this, it suffices to connect together, by means of a wick 7AB, the respective transverse branches of the T-piece 6A8 inserted in the dispensing tube 5A1, and of the T-piece 6B2 inserted in the dispensing tube 5B1; preferably, this connection is made optional by constructing the transverse branch of at least one of the two T-pieces in such a way that the corresponding end of the wick can be removed therefrom, as indicated in broken lines in FIG. 5, a plug (not shown) then being used to close the said transverse branch of the T-piece (for example 6B2) in a leaktight manner; the same arrangement can be adopted for blocking those T-pieces which, in certain cases, do not hold a wick (for example 6A2 in FIG. 5).

The sectional view of FIG. 7 shows that the end of each wick 7 is immobilized in the transverse branch 6a of the corresponding T-piece by clamping and sealing means, which, in the embodiment illustrated, comprise a conical split ring 14, made of a deformable material, for example plastic, which is engaged on the end of the wick 7 and with which a nut 15, screwed to the corresponding branch, 6a, of the T-piece, makes it possible to compress the noted wick 7 to a greater or lesser extent, so as to regulate the flow of liquid into the wick, that is to say the flow of the liquid which passes from the corresponding dispensing tube into the T-piece and then into the wick 7 engaged in its transverse branch 6a. In a manner which is in itself known, the split ring 14 can be produced in such a way that, for a suitable tightening of the nut 15, it almost completely compresses the wick 7 so as to stop the flow of liquid entering the noted wick, whereas, when the nut 15 is completely loosened, the flow of liquid into the wick 7 assumes a maximum value; this arrangement offers the advantage that it makes it possible very easily to regulate the flow of liquid into each of the wicks 7, simply by modifying the tightening of the nuts, such as 15, which are screwed to the transverse branches of the two T-pieces connected by the wick in question.

The present invention is not limited to the embodiment described above. It encompasses all its variants. The number of aligned ramps A, B and the like, the number of dispensing tubes, 5A1, 5A2, and the number of wicks which are associated therewith in each bar can be chosen. The ramp or ramps could be fitted to a pushed vehicle or a vehicle towed by a tractor. The pivoting assembly of the tank of each bar and also of its dispensing tubes is optional. The T-pieces could be replaced by simple transverse branches on the dispensing tubes, which would be externally threaded so that the ends of the wicks could be clamped thereto by means of suitable nuts. In one variant, the dispensing tubes can be U-shaped, their ends being joined directly to those on the bottom of the corresponding tank, which, in that case, would no longer comprise chambers at its ends. The means of clamping the ends of the wicks in the branches of the dispensing tubes can be chosen; they could comprise radially-acting screws and conventional gaskets.

Each tank, such as 4A, can be produced in a single piece, for example by rotational molding, with its pivots, the bearings of the dispensing tubes and, if appropriate, stops for the pivots.

In another embodiment of the invention, a single wick (7 in FIG. 8) extends between the two ends of a dispensing tube 5, which can be fitted, in its central region, 5a, to the end of a tubular handle 15 (see also FIG. 9); this handle 15 is fed with treatment liquid from a portable tank 16, in which the treatment liquid is stored at atmospheric pressure or at a higher pressure. A portable device of this type is particularly advantageous insofar as it permits a very precise manual application of weedkiller.

I claim:

1. A device for depositing a treatment liquid, such as a weedkiller, on plants, when it is moved in a predetermined direction in relation to said plants, this device comprising at least one tank for liquid, at least one wick extending linearly outside of said tank and transversely to said predetermined direction for transferring the liquid contained in the tank to the ends of the said wick, wherein the tank, which has a horizontally elongate shape and a cross-section which is greater than that of the wick, has end portions extended downwards defining at least two chambers, and at least one dispensing tube, which is mounted underneath the bottom of said elongate tank and parallel to its longitudinal axis, the ends of such dispensing tube being mounted so as to pivot, in a leaktight manner, in bearings disposed in the facing walls of said two chambers so that said dispensing tube is fed with liquid from said tank through said two chambers, and wherein this dispensing tube has a cross-sectional shape similar to that of the said wick, and at least two inlet or branches in which the ends of the wick are immobilized by clamping and sealing means, and which are disposed in relation to said dispensing tube, so that the remainder of said wick extends otherwise unsupported in a spaced and substantially parallel relationship to said dispensing tube and said tank, and in front of said dispensing tube and said tank in said predetermined direction.

2. A device as claimed in claim 1, wherein the clamping and sealing means comprise a split ring made of a deformable material, which is engaged on the end of the wick and with which a nut, screwed to the inlet branch of the dispensing tube, makes it possible to compress the said wick in radial directions, so as to regulate the flow of liquid into the wick between a very low, substantially zero value and a maximum value.

3. A device as claimed in claim 1, wherein each elongate tank further comprises an upper wall with at least one obturable filling orifice, and two end walls, respectively provided with outer pivoting means aligned along the longitudinal axis of said tank, and a frame beam is further provided for supporting said pivoting means of each said tank so that it is pivotable from its service position, in which each wick is under the tank, to an out-of-service position, in which each wick is above the tank.

4. A device as claimed in claim 3, wherein said frame beam comprises means for fastening to a support capable of being coupled to a tractor.

* * * * *